United States Patent [19]

Pearson

[11] 4,176,353
[45] Nov. 27, 1979

[54] RADAR ALTIMETER TRACKING CIRCUIT APPARATUS

[75] Inventor: Robert P. Pearson, Roseville, Minn.

[73] Assignee: Honeywell Inc., Minneapolis, Minn.

[21] Appl. No.: 880,909

[22] Filed: Feb. 24, 1978

Related U.S. Application Data

[63] Continuation of Ser. No. 747,667, Dec. 6, 1976, abandoned.

[51] Int. Cl.² .............................................. G01S 9/12
[52] U.S. Cl. .................................................. 343/12 A
[58] Field of Search ...................................... 343/12 A

[56] References Cited

U.S. PATENT DOCUMENTS

| | | | |
|---|---|---|---|
| 3,165,739 | 1/1965 | Long et al. | 343/12 A X |
| 3,242,488 | 3/1966 | Leyde et al. | 343/12 A X |
| 3,344,423 | 9/1967 | Thue | 343/12 A X |
| 3,573,825 | 4/1971 | Westby | 343/12 A X |

*Primary Examiner*—Malcolm F. Hubler
*Attorney, Agent, or Firm*—Henry L. Hanson

[57] ABSTRACT

A radar altimeter having a tracking circuit which includes a controllable reference signal generator which is adapted to selectively control the tracking circuit so that there will be no indication of an altitude change in the event of a momentary loss of a received video signal due to the fading of the video signal or other condition requiring the locking of the tracking circuit because of a lack of reliability of the received video signal.

7 Claims, 4 Drawing Figures

RADAR ALTIMETER TRACKING CIRCUIT APPARATUS

This is a continuation of application Ser. No. 747,667, filed Dec. 6, 1976, now abandoned.

BACKGROUND OF THE INVENTION

The present invention relates to altimeters of the radar type and particularly to altimeters using closed loop tracking circuits. The present invention further relates to means for improving the tracking circuit of a radar altimeter. A typical tracking circuit will utilize a reference signal source which is adapted to be compared with a selected portion of a received video signal. Upon predetermined variations occurring between the two signals, a change in output will cause a change in the indicated altitude and an adjustment made in the tracking loop so that the two signals cancel. If there should be a loss of video signal, an altitude change condition will be indicated and the altimeter circuitry will seek to establish a new altitude indication.

Radar altimeters have been widely used in aircraft for purposes of measuring the altitude of the craft above the terrain immediately below the craft. Under certain operating conditions, particularly conditions such as may be encountered when a helicopter is hovering at low altitudes over certain types of signal absorbing terrain, a return or echo pulse may fluctuate in amplitude and even fade out so that the altimeter cannot carry out its normal terrain tracking or following operation. A typical terrain condition which is likely to create momentary signal fades is one where the surface is flat and sandy, or grassy. Typically, the signal fade condition will be only momentary but the loss of several return or echo pulses will cause the output of the altimeter to go through wide swings so as to render impossible the accurate determination of the altitude.

Representative radar altimeters heretofore known will be found in the following identified references: U.S. Pat. Nos. 3,093,807 L. S. Crane, et al June 11, 1963, 3,249,935 R. J. Follen May 3, 1966, 2,928,085 A. J. Katz Mar. 8, 1960, 3,231,889 W. L. Leyde, et al Jan. 25, 1966, 3,242,488 W. L. Leyde, et al Mar. 22, 1966, 3,251,058 J. A. Sutcliffe May 10, 1966, 3,243,803 B. H. Thue Mar. 29, 1966, 3,344,423 B. H. Thue Sept. 26, 1967, 3,752,582 Troll, et al Aug. 14, 1973.

SUMMARY OF THE INVENTION

The present invention comprises a new and improved radar altimeter that incorporates a closed loop tracking circuit and which incorporates special circuitry to minimize the effects of a received signal fade or signal loss condition, said circuit having a pulse current reference signal generator connected thereto which is activated only in the event that the received video or echo signal is of at least a minimum amplitude adequate for purposes of determining the correct altitude. In one preferred embodiment of the invention, the pulse current signal reference generator takes the form of a monostable multivibrator having a gated input which is activated only in the event that there is a reference pulse from the tracking circuit and a video signal from the receiver of the altimeter. This monostable multivibrator is adapted to produce a reference current pulse of a predetermined fixed amplitude which is adapted to be compared with a signal representing the extent that there is an overlap between a tracking gate pulse and a received video phase.

BRIEF DESCRIPTION OF THE DRAWINGS

Referring to FIG. 1, there is here illustrated a diagramatic representation of radar altimeter which incorporates the present invention. The radar altimeter includes a radar pulse transmitter 10 which is adapted to transmit radio frequency pulses. The pulses are radiated by way of an antenna 12 to a surface, not shown, and reflected back to a receiving antenna 14. The received radio frequency pulses or echo pulses will be picked up and amplified by the receiver 16, demodulated and converted into video pulses which will be amplified by a video amplifier 18. The output 20 of the video amplifier 18 is connected to the input of an error signal amplifier 22.

Figure 1:
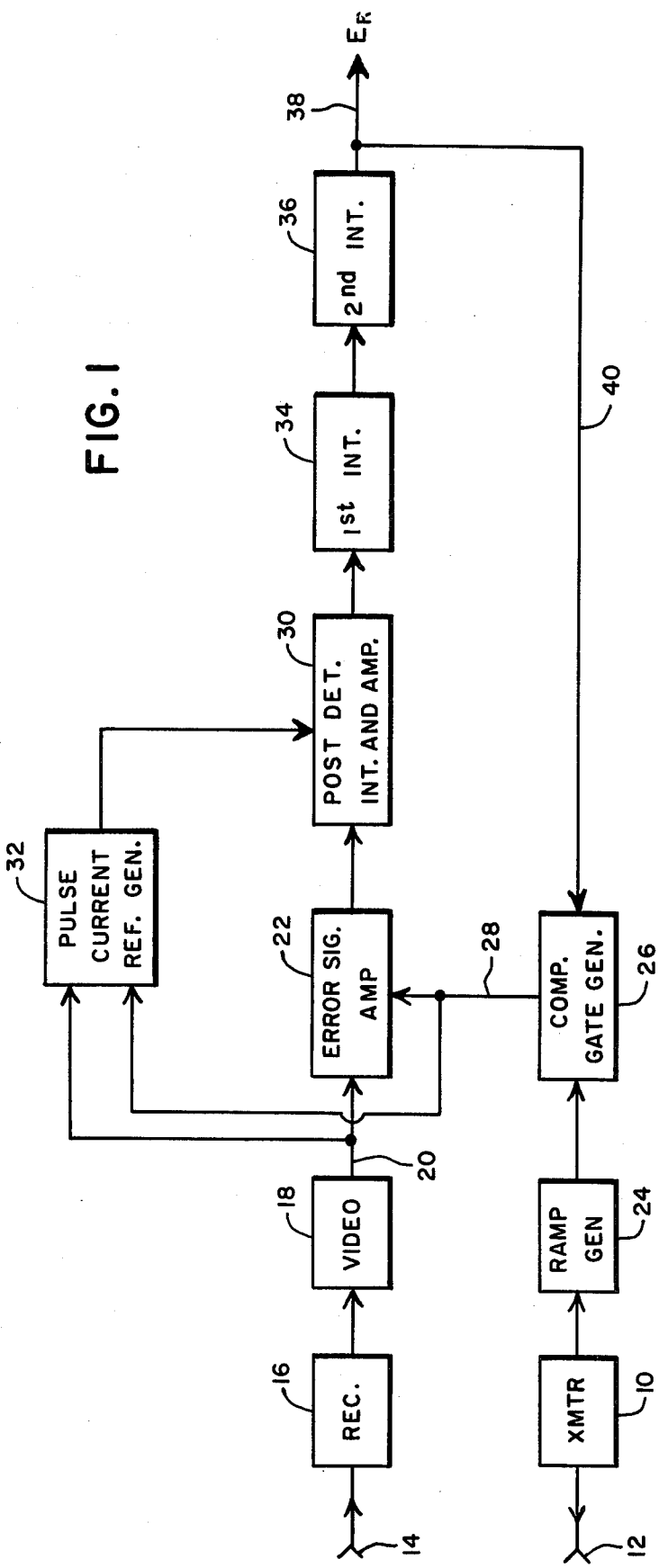
FIG. 1 is a diagrammatic illustration of the principal elements of a tracking loop type of radar altimeter which incorporates the pulse current reference signal generator.

At the time that the transmitter 10 sends out a radar pulse, it also provides a timing pulse to activate a ramp generator 24, the output of which is connected to the input of a comparison gate generator 26. The output of the comparison gate generator 26 is coupled by way of its output lead 28 to an input on the error signal amplifier 22.

The output of the error signal amplifier is coupled to a post detector integrator and amplifier circuit 30. This particular circuit 30 also receives an input from a pulse current signal reference generator 32. This generator circuit 32 has inputs derived from the video amplifier output lead 20 and the comparison gate generator output lead 28. The output of the integrator and amplifier circuit 30 is coupled to a pair of series connected integrator circuits 34 and 36, the latter of which has an output signal $E_R$ on lead 38 which is representative of the altitude being measured. The output lead 28 is also coupled back to the comparison gate generator 26 by way of lead 40.

The amplifier 22, integrator and amplifier 30, the two integrators 34 and 36, and the comparison gate generator 26 form a closed loop which is sometimes referred to as the tracking loop in this type of radar altimeter.

For ease of explaining the present invention, certain portions of a typical complete radar altimeter have not been illustrated inasmuch as they form no part of the present invention. However, reference should be made to prior art such as noted above and, in particular, to the Leyde, et al U.S. Pat. No. 3,242,488, which illustrates, among other things, apparatus for carrying out the search mode of operation which is utilized at the time that an altimeter of the present type is first energized or in the event that there has been a loss of a received video signal which loss will cause the altimeter apparatus to switch from its normal altitude measuring function into a search mode of operation.

Figure 3:
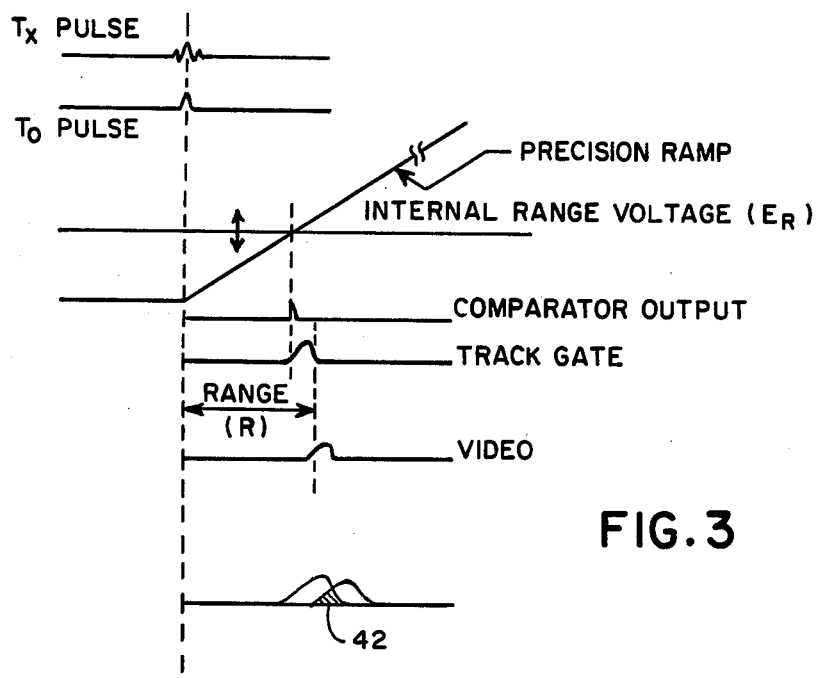
FIG. 3 illustrates typical wave forms associated with the normal operation of FIG. 1.

To understand the basic functioning of the apparatus of FIG. 1, reference should be made to FIG. 3 which illustrates some of the signal wave forms associated with the normal altitude measuring function. As illustrated in FIG. 3, at the time that a transmitter pulse $T_x$ occurs, a timing pulse $T_o$ also occurs and this latter pulse activates the ramp generator 24 which will produce a precision ramp signal on its output. This ramp signal is fed into the comparison gate generator 26. Inasmuch as it is assumed that the altimeter is "on track" and in its altitude measuring mode, there will be a predetermined output signal $E_R$ on the output lead 38. This will be a d.c. signal which will be coupled back by way of lead 40 into the comparison gate generator 26. The comparison gate generator 26 is so arranged that when the ramp signal crosses over the altitude or internal range voltage signal $E_R$, there will be a pulse created which will in turn create a track gate pulse on the output lead 28.

The transmitted pulse $T_x$ will be reflected back from the adjacent surface and picked up by the antenna 14. The output of the antenna 14 will then be demodulated in the receiver 16 and a video signal will be amplified by the amplifier 18 and then appear on the output lead 20 at a time that will be directly proportional to the echo time between the time of the transmitted pulse and that of the return signal into the receiver 16. This will be directly proportional to the range or altitude being measured. In FIG. 3, the video signal is shown occurring slightly after the time of the track gate signal so that there is a period of time overlap between the two signals. The period of overlap is illustrated in FIG. 3 at 42.

In the circuitry of FIG. 1, the video signal on lead 20 is coupled into the error signal amplifier 22 and the track gate signal on the lead 28 is also coupled into this same circuit. The overlap, as at 42 in FIG. 3, will be determined in this circuit 22 and the overlap signal will be fed into the post detector integrator and amplifier circuit 30. As has been taught in the prior art, a reference signal is provided and used for comparison purposes with the overlap signal 42. Deviations in the amount of the overlap between the two signals will cause deviations in the amplitude of the resultant signal. When compared with the reference signal in the circuitry it is possible to indicate that the altitude condition is increasing or decreasing depending upon the direction and amount of deviation. Typically, the reference signal used in the prior art for comparison with the overlap signal has been a steady state signal. Under normal operating conditions, the steady state signal will be quite adequate inasmuch as there will always be an adequate return video signal with which a comparison may be made with the track gate signal. While a momentary loss of video signal will cause the altimeter to switch into its search mode, as noted above, such will normally not be a problem since the frequency of such losses of video signal is likely to be very low.

It has been found that when radar altimeters of the present type are utilized on helicopters which are operating at relatively low altitudes, such as, for example, about 30 feet, certain types of terrain, typical of that experienced when the helicopter is hovering over a loading zone, will cause the signal reflected from the terrain to fade periodically and this in turn causes the radar altimeter to switch into the search mode and, even though the helicopter remains in a fixed position, the radar altimeter output signal will begin to have wide excursions and with considerable rapidity, so as to cause a loss of effective altitude measurement. The problem is not as critical at higher altitudes for the reason that the cone of radiated energy from the transmitter antenna will be broader and there is a greater likelihood of there being a reflective surface which will produce R.F. signal cancellation. At the lower altitudes, however, the cone diameter will be relatively small so that the possibility of loss of received signal is considerably greater. The circuit allows the blanking of the altimeter transmitter for several P.R.F. periods without affecting accuracy.

The present invention involves the use of a special form of pulse current reference signal generator which is used for comparison with the overlap signal produced in the error signal amplifier 22. The pulse current reference generator 32 is arranged to produce an output pulse of controlled amplitude and duration only upon the occurrence of a valid video signal on the output lead 20.

If there is a loss of video signal, the pulse current reference generator 32 will not produce an output reference signal on the input of the post detector integrator and amplifier circuit 30. This will mean that there will be no indicated change in output from the circuit 30 coupled into the input of the first integrator circuit 34. With no change, the output signal $E_R$ will remain in a steady state condition. When the video fade condition disappears, there will be a video signal and this then will serve to activate the pulse current signal reference generator 32 and a standard reference pulse will be applied to the post detector integrator and amplifier circuit 30. The altimeter will then function in its normal manner. Thus, if the overlap signal on the output of the amplifier 22 is equal in amplitude to that of the reference signal, there will still be no change in the output of the amplifier circuit 30 so that no change will be indicated on the input of the first integrator circuit 34.

Figure 2:
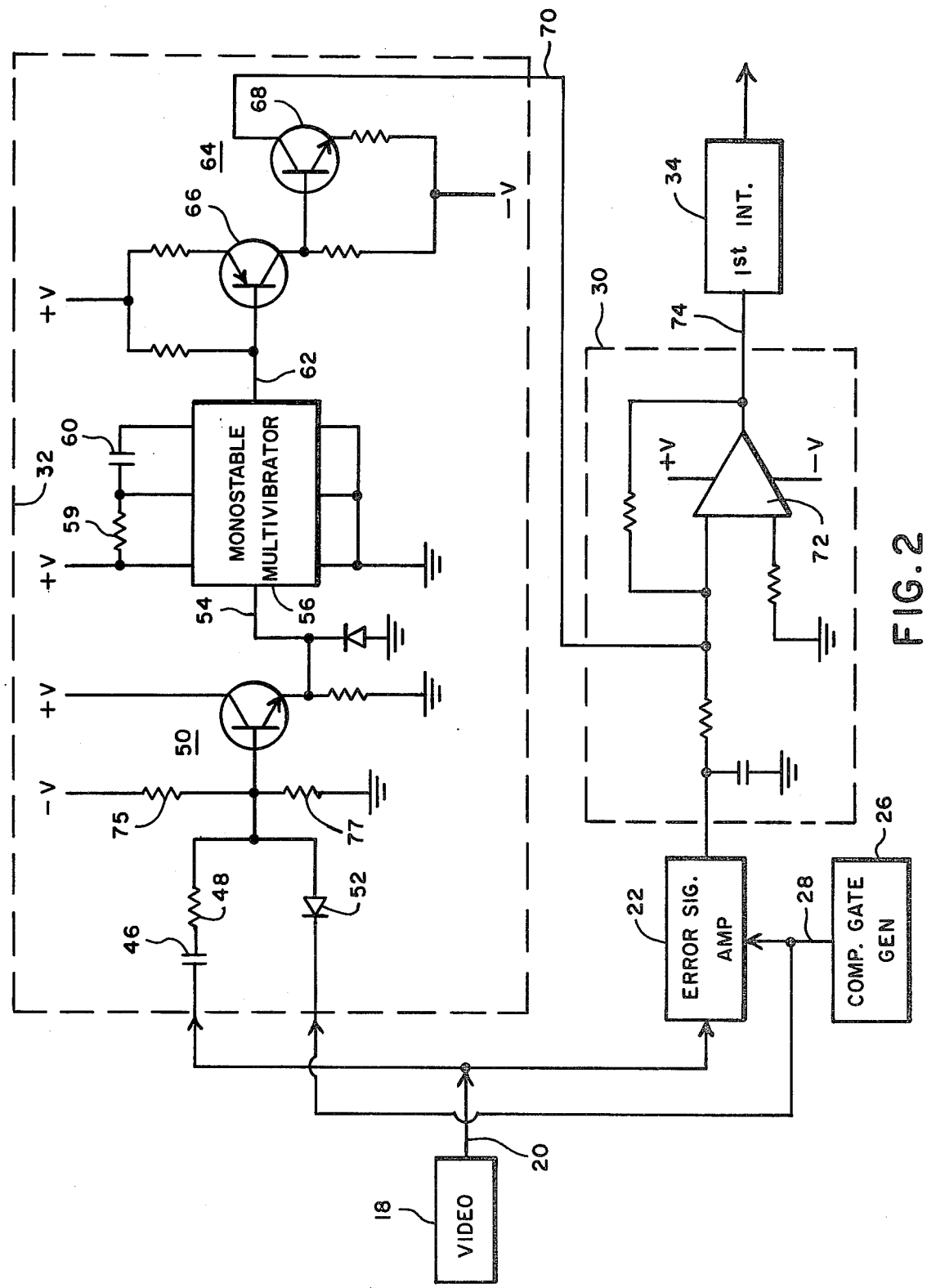
FIG. 2 illustrates the circuit detail of the pulse current reference signal generator in combination with the post detector integrator and amplifier circuit of the altimeter.

FIG. 2 illustrates in greater detail the circuitry utilized in the pulse current reference signal generator 32 and the post detector integrator and amplifier 30. As shown, the generator circuit 32 has coupled to its input the video output of the video amplifier 18 and the track gate signal on the output of the comparison gate generator 26. The video signal on the lead 20 is coupled into the circuit 32, through the series connected capacitor 46 and resistor 48 to the input of an emitter-follower circuit 50. A track gate signal is coupled into the circuit 32 by way of the lead 28 and the diode 52, the latter of which has its output also connected to the input of the emitter-follower circuit 50. The emitter-follower is reversed biased to set a minimum video amplitude threshold by resistors 75 and 77. The output of the emitter-follower circuit 50 is coupled by way of lead 54 to the input of a monolithic integrated circuit 56 which, in the preferred embodiment, takes the form of a monostable multivibrator having its time constant controlled by the resistor 59 and the capacitor 60. The integrated circuit type selected in one embodiment was an MC54121 circuit wherein the time constant controlling resistor 59 and capacitor 60 were selected so that the output pulse appearing on an output lead 62 would be approximately 10 microseconds in duration.

The signal on the lead 62 is coupled into an output amplifier circuit 64 comprising a pair of transistors 66 and 68 which are directly coupled together and which will provide a controlled output signal reference current on the output lead 70 which is adapted to be fed as a reference signal into the post detector integrator and amplifier circuit 30. The reference signal appearing on the lead 70 will be compared with the output overlap signal from the amplifier 22, the two input signals to the circuit 30 being of an amplitude such that if the overlap signal is equal in amplitude to the amplitude of the reference signal, the signals will cancel and there will be no input applied to the differential amplifier circuit 72. If the input overlap signal is larger in amplitude than that of the reference signal, the differential amplifier 72 will be effective to produce an increasing amplitude output signal on its output lead 74. Conversely, if the input overlap signal is smaller in amplitude than the reference signal, a decreasing amplitude signal will appear on the output lead 74. The lead 74 is in turn coupled to the input of the first integrator 34.

If there should be a video signal fade, as discussed above, there will be no overlap signal appearing on the output of the amplifier 22. If the reference signal is present under those conditions, there would be a deviation signal indicated on the input of the differential amplifier 72 so that a change in amplitude conditions would appear on the output lead 74. To prevent this unwanted condition from occurring, the pulse current reference generator is arranged, due to the coupling of the video signal into its input, so that it will not produce an output reference signal if the video signal drops below a predetermined amplitude or fades out entirely. This prevents the appearance of a reference signal on the lead 70 on the input of the differential amplifier 72. Thus, the absence of a video signal will cause the circuit to hold its previous altitude indication.

The length of time that the overall altimeter will serve to hold the altitude without initiating a search mode of operation will be determined by the search hold delay time incorporated in the altimeter circuits not illustrated herein. It has been found that an input video fade signal can be tolerated for a period of up to 250 milliseconds duration without any visible altitude change indication in the output altitude indicator.

Figure 4:
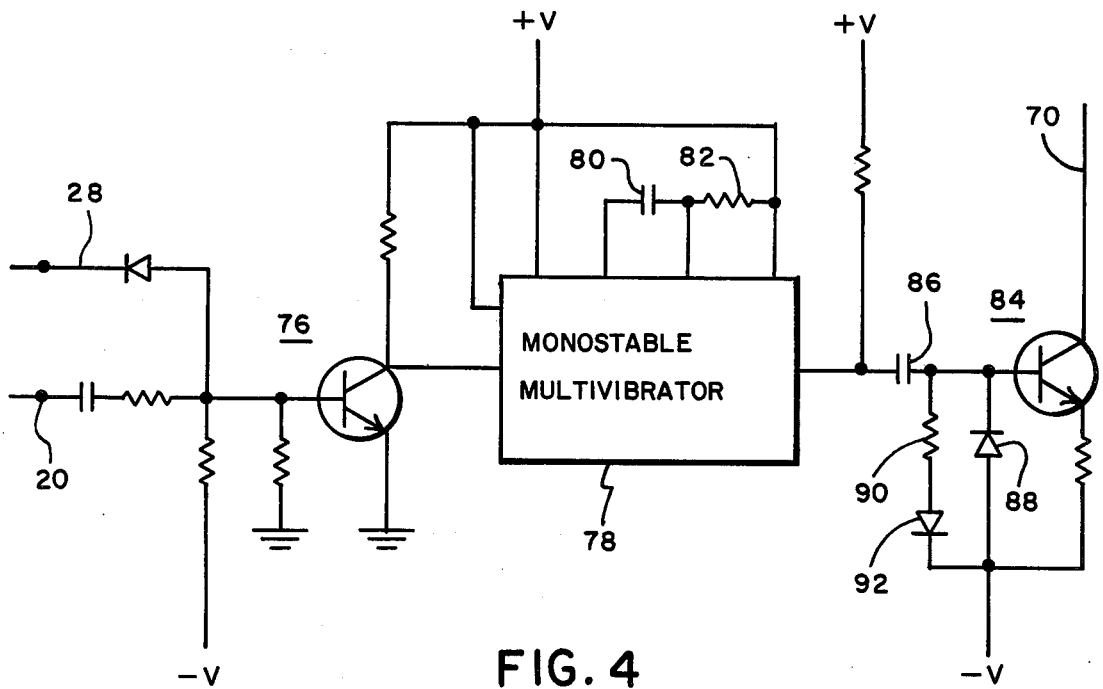
FIG. 4 illustrates a modified form of monostable multivibrator circuit used as a pulse reference signal source.

A modified form of pulse current signal reference generator usable in accordance with the principles of the present invention will be found in FIG. 4. In this particular version, the input amplifier has been modified and appears as a grounded emitter amplifier 76 having its output collector connected to the input of a further monolithic integrated circuit 78 which takes the form of a monostable multivibrator. The time constant of the monostable multivibrator will be controlled by the capacitor 80 and the resistor 82. The monolithic integrated circuit may be of the same type as referenced above for circuit 56. The output of the monostable multivibrator is coupled to a single output transistor circuit 84 by way of a coupling condensor 86. The base of the transistor of the circuit 84 is coupled to negative power supply terminal by way of a clamping diode 88 and by way of a compensating circuit comprising a resistor 90 and a further diode 92. The current flowing in the output lead 70 will be the reference current utilized on one of the inputs to the post detector integrator and amplifier circuit 30.

It will be readily apparent that the pulse current signal reference generator 32 may be controlled by other means which, for example, may sense the presense of a jamming signal. Further, the signal reference generator may be in a form of circuit other than a monostable multivibrator so long as the output signal reference pulse is directly timed and related to the anticipated time occurrence of a video signal from the video amplifier 18.

There have been illustrated and described preferred embodiments of the invention.

It will be obvious to those skilled in the art that other modifications may be made within the spirit of the invention in addition to those indicated above and, therefore, the scope of the invention should be considered in the light of the claims in which the invention is claimed as follows:

1. A radar altimeter for determining the altitude of a craft above a surface comprising:
   a radar pulse transmitter adapted to transmit radio frequency pulses;
   a receiver adapted to receive reflected radio frequency pulses from a surface, said receiver including means to produce video signals having an amplitude corresponding to the reflected pulses;
   a gate pulse generator connected to said transmitter to produce a gate signal pulse following each transmitted pulse and displaced in time from each of said transmitted pulses by an amount corresponding to a prior altitude signal determined by the transit time of a transmitted pulse to radiate to the surface and back to said receiver during a previous transmission;
   pulse signal comparison means connected to said receiver and to said gate pulse generator to produce on the output thereof a control signal having an amplitude indicative of any signal overlap between a video signal from said receiver and said gate signal pulse;
   a reference signal pulse generating source having an output connected to an output of said pulse signal comparison means and having an output signal pulse thereon whose amplitude represents a predetermined standard for comparison with said control signal on the output of said pulse signal comparison means;
   and means connecting the video signals from said receiver to an input of said reference signal pulse generating source to activate said reference signal source only upon the occurrence of a video signal from said receiver.

2. An altimeter as claimed in claim 1 wherein said reference signal source has input means connected to outputs of said receiver and said gate pulse generator so that said source will be activated upon the occurrence of a video signal from said receiver and said gate signal pulse from said gate pulse generator.

3. An altimeter as claimed in claim 2 wherein said reference signal pulse generating source comprises a monostable multivibrator having an output pulse whose amplitude represents said predetermined standard.

4. A radar altimeter for determining the altitude of a craft above a surface which altimeter includes a signal transmitter, a signal receiver which is adapted to produce a return signal following a signal transmission by the signal transmitter and a closed loop tracking circuit, the improvement comprising:
   a gate pulse generator connected in said tracking circuit to form a part thereof and to an output of said transmitter to produce a gate signal pulse positioned in time to represent a previous altitude determination;
   pulse signal comparison means connected in said tracking circuit to form a further part thereof and to receive on inputs thereof a return signal from said signal receiver and a signal from said gate pulse generator to produce a control signal having an amplitude indicative of any signal overlap between said return signal and said gate signal pulse;

a reference pulse generating source connected to said pulse signal comparison means and having an output signal whose amplitude represents a predetermined standard for comparison with said control signal from said pulse signal comparison means;

and reference signal control means connected to activate said signal reference pulse generating source only upon the occurrence of an input control signal.

5. An altimeter as claimed in claim 4 wherein said reference signal control means connected to said receiver will activate said reference signal source only upon the occurrence of a proper return signal.

6. An altimeter as claimed in claim 5 wherein said reference signal control means is connected to an input means of said reference signal source and to outputs of said signal receiver and said gate pulse generator so that upon the occurrence of a return signal from said signal receiver and said gate signal pulse from said gate pulse generator said reference signal source will be activated.

7. An altimeter as claimed in claim 6 wherein said signal reference pulse generating source comprises a monostable multivibrator having an output pulse whose amplitude represents said predetermined standard.

* * * * *